United States Patent
Isomura

(10) Patent No.: US 8,009,204 B2
(45) Date of Patent: Aug. 30, 2011

(54) IMAGE CAPTURING APPARATUS, IMAGE CAPTURING METHOD, IMAGE PROCESSING APPARATUS, IMAGE PROCESSING METHOD AND COMPUTER-READABLE MEDIUM

(75) Inventor: Ayumu Isomura, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 754 days.

(21) Appl. No.: 11/937,994

(22) Filed: Nov. 9, 2007

(65) Prior Publication Data
US 2008/0088717 A1 Apr. 17, 2008

Related U.S. Application Data

(63) Continuation of application No. PCT/JP2006/309882, filed on May 11, 2006.

(30) Foreign Application Priority Data

May 11, 2005 (JP) ................................ 2005-139138

(51) Int. Cl.
*H04N 5/232* (2006.01)
*H04N 5/262* (2006.01)
*G03B 13/00* (2006.01)

(52) U.S. Cl. .................. 348/231.3; 348/231.2; 348/239; 348/345

(58) Field of Classification Search .............. 348/207.1, 348/231.99, 231.2, 231.3, 231.6, 239, 345
See application file for complete search history.

(56) References Cited

U.S. PATENT DOCUMENTS

| 7,705,908 B2 * | 4/2010 | Fredlund et al. ............. 348/349 |
| 2003/0142224 A1 * | 7/2003 | Fukuda et al. ............. 348/231.3 |
| 2003/0189647 A1 * | 10/2003 | Kang ........................ 348/207.99 |
| 2004/0109071 A1 * | 6/2004 | Kido et al. ................. 348/231.2 |

FOREIGN PATENT DOCUMENTS

| EP | 1471455 A2 | 10/2004 |
| JP | 10-126731 A | 5/1998 |
| JP | 2003-224767 A | 8/2003 |
| JP | 2003-241073 A | 8/2003 |
| JP | 2005-109569 A | 4/2005 |

OTHER PUBLICATIONS

European Search Report issued in EP Patent Application No. 06732631 dated Sep. 27, 2010.

* cited by examiner

*Primary Examiner* — Sinh Tran
*Assistant Examiner* — Daniel M Pasiewicz
(74) *Attorney, Agent, or Firm* — Sughrue Mion, PLLC

(57) ABSTRACT

An image capturing apparatus for recording information on a main subject, including: an image capturing section; a pre-image acquiring section for acquiring a pre-image when a focal point provided at a predetermined position within an image capturing region of the image capturing section is superimposed on the main subject; a focal distance adjusting section for adjusting a focal distance of the image capturing section to a main subject based on an analysis result of the pre-image acquired by the pre-image acquiring section; a captured image acquiring section for acquiring the captured image when the image capturing section focuses on the main subject; a focal position storage section for storing the focal position on an image capturing range of the image capturing section; and an image storage section for storing the region image including the focal position in a nonvolatile memory in association with the captured image acquired.

4 Claims, 7 Drawing Sheets

250

| IMAGE ID | REGION IMAGE ID | | |
|---|---|---|---|
| #501 | #511 | #512 | ... |
| #502 | #513 | — | ... |
| ⋮ | ⋮ | ⋮ | ⋮ |

| ID | REGION IMAGE ID | | | COMMENT |
|---|---|---|---|---|
| #551 | #511 | #513 | ... | Nana |
| #552 | #512 | ... | ... | POCHI |
| ⋮ | ⋮ | ⋮ | ⋮ | ⋮ |

*FIG. 5*

IMAGE CAPTURING APPARATUS, IMAGE CAPTURING METHOD, IMAGE PROCESSING APPARATUS, IMAGE PROCESSING METHOD AND COMPUTER-READABLE MEDIUM

TECHNICAL FIELD

The present invention relates to an image capturing apparatus, an image capturing method, an image processing apparatus, an image processing method and a computer-readable medium storing thereon a program. Particularly, the program is used for the image capturing apparatus and the image processing apparatus. Further, the present invention relates to a Japanese Patent Application No. 2005-139138 filed in JP on May 11, 2005, the contents of which are incorporated herein by reference for all purpose if applicable in the designated state.

BACKGROUND ART

Conventionally, a technology for creating an album has been known that the map of travel destination is disposed at the center of a screen, images are disposed around the map based on tag information such as position information and image capturing time information associated with image data captured in traveling, and the images and the image capturing positions on the map are connected by lines, so that the relationship between the map and the images can be identified, for example as disclosed in Japanese Patent Application Publication No. 10-126731.

DISCLOSURE OF THE INVENTION

Problems to be Solved by the Invention

However, according to the above-described conventional art, an image can not be laid out based on the content of the subject of the image. Therefore, when an image on which a title is superimposed is outputted, the title is sometime superimposed directly on the main subject in the image. It is preferred that the title is laid out the image except for the position of the main subject.

Thus, an object of the present invention is to provide an image capturing apparatus, an image capturing method, an image processing apparatus, an image processing method and a program which can solve the above-described problem. This object is achieved by combining the features recited in independent claims. Then, dependent claims define further effective specific example of the present invention.

Means for Solving the Problems

A first aspect of the present invention provides an image capturing apparatus. The image capturing apparatus includes: an image capturing section; a pre-image acquiring section for acquiring a pre-image captured by the image capturing section when a focal point provided at a predetermined position in an image capturing region of the image capturing section is superimposed on the main subject; a focal distance adjusting section for adjusting a focal distance of the image capturing section to the main subject based on the analysis result of the pre-image acquired by the pre-image acquiring section; a captured image acquiring section for acquiring the image captured by the image capturing section when image capturing section focuses on the main subject; a focal position storage section for storing the focal position on the image capturing range of the image capturing section; and an image storage section for storing a region image including the focal position stored in the focal position storage section in the pre-image acquired by the pre-image acquiring section in a nonvolatile memory in association with the image acquired by the captured image acquiring section.

The image capturing apparatus further includes an output section for outputting the captured image in association with the region image stored in the nonvolatile image to an external device. The pre-image acquired by the pre-image acquiring section of which resolution may be lower than the resolution of the captured image acquired by the captured image acquiring section. The pre-image acquiring section may acquire a part of the region including the focal point within the image capturing region of the image capturing section.

The image capturing apparatus further includes a main subject extracting section for extracting the main subject from the pre-image acquired by the pre-image acquiring section based on the focal position on the image capturing range of the image capturing section which is stored in the focal position storage section, a main subject position identifying section for identifying the position of the main subject extracted by the main subject extracting section in the captured image acquired by the captured image acquiring section and a main-subject position storage section for storing the position of the main subject in the captured image identified by the main subject position identifying section.

The image capturing apparatus further includes an instruction input button for causing the pre-image acquiring section to acquire a pre-image through half-pushing by a user and for causing the captured image acquiring section to acquire the captured image through full-pushing by the user. The pre-image acquiring section may acquire the pre-image captured by the image capturing section through half-pushing the instruction input button. The image capturing section may adjust the focal distance to the main subject on which the focal point is superimposed. The captured image acquiring section may acquire the image captured by the captured image acquiring section after the image capturing section adjusts the focal distance to the main subject through full-pushing the instruction input button.

The pre-image acquiring section may acquire a plurality of pre-images which are captured by the image capturing section every time the instruction input button is half-pushed. The focal distance adjusting section may adjust the focal distance to the main subject on which the focal position is superimposed based on the analysis result of the pre-image acquired by the pre-image acquiring section. The focal position storage section stores the focal position on the image capturing range of the image capturing section which is adjusted by the focal distance adjusting section every time the instruction input button is half-pushed. The image capturing section determines an image capturing condition based on a plurality of focal distances adjusted by the focal distance adjusting section every time the instruction input button is half-pushed in the case that the instruction input button is half-pushed several times. The captured image acquiring section may acquire the image captured by the image capturing section after the image capturing condition is adjusted to the image capturing condition determined by the image capturing section through full-pushing the instruction input button. The image storage section may store in the nonvolatile memory the range image including the focal position stored in the focal position storage section for each of the plurality of pre-images acquired by the pre-image acquiring section every time the instruction input button is half-pushed in association with the captured image acquired by the captured image acquiring section.

The image capturing section may determine the focal distance obtained by averaging the focal distance adjusted to the main subject by the focal distance adjusting section every time the instruction input button is half-pushed. The captured image acquiring section may acquire the image captured by the image capturing section after the image capturing condition is adjusted to the focal distance determined by the image capturing section when the instruction input button is full-pushed after it is half-pushed several times.

The image capturing section may determine depth of field based on the focal distance adjusted to the main subject by the focal distance adjusting section every time the instruction input button is half-pushed in the case that the instruction input button is half-pushed several times. The captured image acquiring section may acquire the image captured by the image capturing section after the image capturing condition is adjusted to the depth of field determined by the image capturing section when the instruction input button is full-pushed after it is half-pushed several times.

The image capturing apparatus further includes an exposure adjusting section for adjusting the exposure of the image capturing section to the main subject focused on based on the analysis result of the pre-image acquired by the pre-image acquiring section every time the instruction input button is half-pushed. The image capturing section may determine the image capturing condition further based on a plurality of exposure values adjusted by the exposure adjusting section every time the instruction input button is half-pushed in the case that the instruction input button is half-pushed several times. The captured image acquiring section may acquire the image captured by the image capturing section after the image capturing condition is adjusted to the image capturing condition determined by the image capturing section when the instruction input button is full-pushed after it is half-pushed several times.

The image capturing apparatus further includes a degree of similarity calculating section for calculating the degree of similarity between a first region image and a second region image by comparing the first region image stored in the nonvolatile memory with the second region image to be newly stored in the nonvolatile memory and an identification information determining section for determining the same identification information for the first region image and the second region image when the degree of similarity calculated by the degree of similarity calculating section is larger than a predetermined degree of similarity. The image storage section may store the first region image and the second region image in the nonvolatile memory in association with the identification information determined by the identification information determining section.

A second aspect of the present invention provides an image capturing method. The image capturing method includes the steps of: capturing an image; acquiring a pre-image captured in the image capturing step when a focal point provided at a predetermined position in an image capturing region in the image capturing step is superimposed on the main subject; adjusting a focal distance in the image capturing step to the main subject based on the analysis result of the pre-image acquired in the pre-image acquiring step; acquiring the image captured in the image capturing step when the main subject is focused in the image capturing step; storing the focal position on the image capturing range in the image capturing step; and storing a region image including the focal position stored in the focal position storing step in a nonvolatile memory in association with the image acquired in the captured image acquiring step.

A third aspect of the present invention provides a computer-readable medium storing thereon a program for an image capturing apparatus for capturing images. The program operates the image capturing apparatus to function as: an image capturing module; a pre-image acquiring module for acquiring a pre-image captured by the image capturing module when a focal point provided at a predetermined position in an image capturing region of the image capturing module is superimposed on the main subject; a focal distance adjusting module for adjusting a focal distance of the image capturing module to the main subject based on the analysis result of the pre-image acquired by the pre-image acquiring module; a captured image acquiring module for acquiring the image captured by the image capturing module when image capturing module focuses on the main subject; a focal position storage module for storing the focal position on the image capturing range of the image capturing module; and an image storage module for storing a region image including the focal position stored in the focal position storage module in the pre-image acquired by the pre-image acquiring module in a nonvolatile memory in association with the image acquired by the captured image acquiring module.

A fourth aspect of the present invention provides an image capturing apparatus. The image capturing apparatus includes: an image capturing section; a line of sight detecting section for detecting the line of sight of a photographer to the image capturing region of the image capturing section; a focal point determining section for determining the focal point at a position within the image capturing region indicated by the line of sight detected by the line of sight detecting section; a pre-image acquiring section for acquiring the pre-image captured by the image capturing section when the focal point determined by the focal point determining section is superimposed on the main subject; a focal distance adjusting section for adjusting the focal distance of the image capturing section to the main subject based on the analysis result of the pre-image acquired by the pre-image acquiring section; a captured image acquiring section for acquiring the image captured by the image capturing section when the image capturing section focuses on the main subject; a focal position storage section for storing a focal position on the image capturing range of the image capturing section; and an image storage section for storing a region image including the focal position stored in the focal position storage section in the pre-image acquired by the pre-image acquiring section in a nonvolatile memory in association with the captured image acquired by the captured image acquiring section.

A fifth aspect of the present invention provides an image capturing method. The image capturing method includes: detecting the line of sight of a photographer to the image capturing region in an image capturing section; determining the focal point at the position within the image capturing region indicated by the line of sight detected in the line of sight detecting step; acquiring the pre-image captured by the image capturing section when the focal point determined by the focal point determining section is superimposed on the main subject; adjusting the focal distance of the image capturing section to the main subject based on the analysis result of the pre-image acquired in the pre-image acquiring step; acquiring the image captured by the image capturing section when the image capturing section focuses on the main subject; storing a focal position on the image capturing range of the image capturing section; and storing a region image including the focal position stored in the focal position storing step in the pre-image acquired in the pre-image acquiring step in a nonvolatile memory in association with the captured image acquired in the captured image acquiring step.

A sixth aspect of the present invention provides a computer-readable medium storing thereon a program for an image capturing apparatus. The program operates the image capturing apparatus to function as: an image capturing module; a line of sight detecting module for detecting the line of sight of a photographer to the image capturing region of the image capturing module; a focal point determining module for determining the focal point at a position within the image capturing region indicated by the line of sight detected by the line of sight detecting module; a pre-image acquiring module for acquiring the pre-image captured by the image capturing module when the focal point determined by the focal point determining module is superimposed on the main subject; a focal distance adjusting module for adjusting the focal distance of the image capturing module to the main subject based on the analysis result of the pre-image acquired by the pre-image acquiring module; a captured image acquiring module for acquiring the image captured by the image capturing module when the image capturing module focuses on the main subject; a focal position storage module for storing a focal position on the image capturing range of the image capturing module; and an image storage module for storing a region image including the focal position stored in the focal position storage module in the pre-image acquired by the pre-image acquiring module in a nonvolatile memory in association with the captured image acquired by the captured image acquiring module.

A seventh aspect of the present invention provides an image processing apparatus. The image processing apparatus includes: a pre-image acquiring section for acquiring a pre-image captured when a focal point provided at a predetermined position within an image capturing range of an image capturing apparatus is superimposed on a main subject; a captured image acquiring section for acquiring the image captured by the image capturing apparatus when the image capturing apparatus focuses on the main subject; a focal position storage section for storing a focal position on the image capturing range of the image capturing apparatus; a main subject extracting section for extracting the main subject from the pre-image acquired by the pre-image acquiring section based on the focal position on the image capturing range of the image capturing apparatus which is stored in the focal position storage section; and a main subject position identifying section for identifying the position of the main subject extracted by the main subject extracting section in the captured image acquired by the captured image acquiring section.

The image processing apparatus may further include a layout section for laying out a plurality of images into an output area such that the plurality of captured images are not superimposed on the position of the main subject in the captured image which is identified by the main subject position identifying section. Additionally, the image processing apparatus may further include a character information inserting section for inserting character information into the output area such that the character information is not superimposed on the position of the main subject in the captured image which is identified by the main subject position identifying section.

An eight aspect of the present invention provides an image processing method. The image processing method includes the steps of: acquiring a pre-image captured when a focal point provided at a predetermined position within an image capturing range of an image capturing apparatus is superimposed on a main subject; acquiring the image captured by the image capturing apparatus when the image capturing apparatus focuses on the main subject; storing a focal position on the image capturing range of the image capturing apparatus; extracting the main subject from the pre-image acquired in the pre-image acquiring step based on the focal position on the image capturing range of the image capturing apparatus which is stored in the focal position storage step; and identifying the position of the main subject extracted in the main subject extracting step in the captured image acquired in the captured image acquiring step.

A ninth aspect of the present invention provides a computer-readable medium storing thereon a program for an image processing apparatus. The program operates the image processing apparatus to function as: a pre-image acquiring module for acquiring a pre-image captured when a focal point provided at a predetermined position within an image capturing range of an image capturing apparatus is superimposed on a main subject; a captured image acquiring module for acquiring the image captured by the image capturing apparatus when the image capturing apparatus focuses on the main subject; a focal position storage module for storing a focal position on the image capturing range of the image capturing apparatus; a main subject extracting module for extracting the main subject from the pre-image acquired by the pre-image acquiring module based on the focal position on the image capturing range of the image capturing apparatus which is stored in the focal position storage module; and a main subject position identifying module for identifying the position of the main subject extracted by the main subject extracting module in the captured image acquired by the captured image acquiring module.

Here, all necessary features of the present invention are not listed in the summary of the invention. The sub-combinations of the features may become the invention.

Effect of the Invention

According to the present invention, an image capturing apparatus for recording information on the main subject when an image is captured can be provided.

BRIEF DESCRIPTION OF THE DRAWINGS

FIG. 5 shows an example of data stored in a nonvolatile memory 250;

BEST MODE FOR CARRYING OUT THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
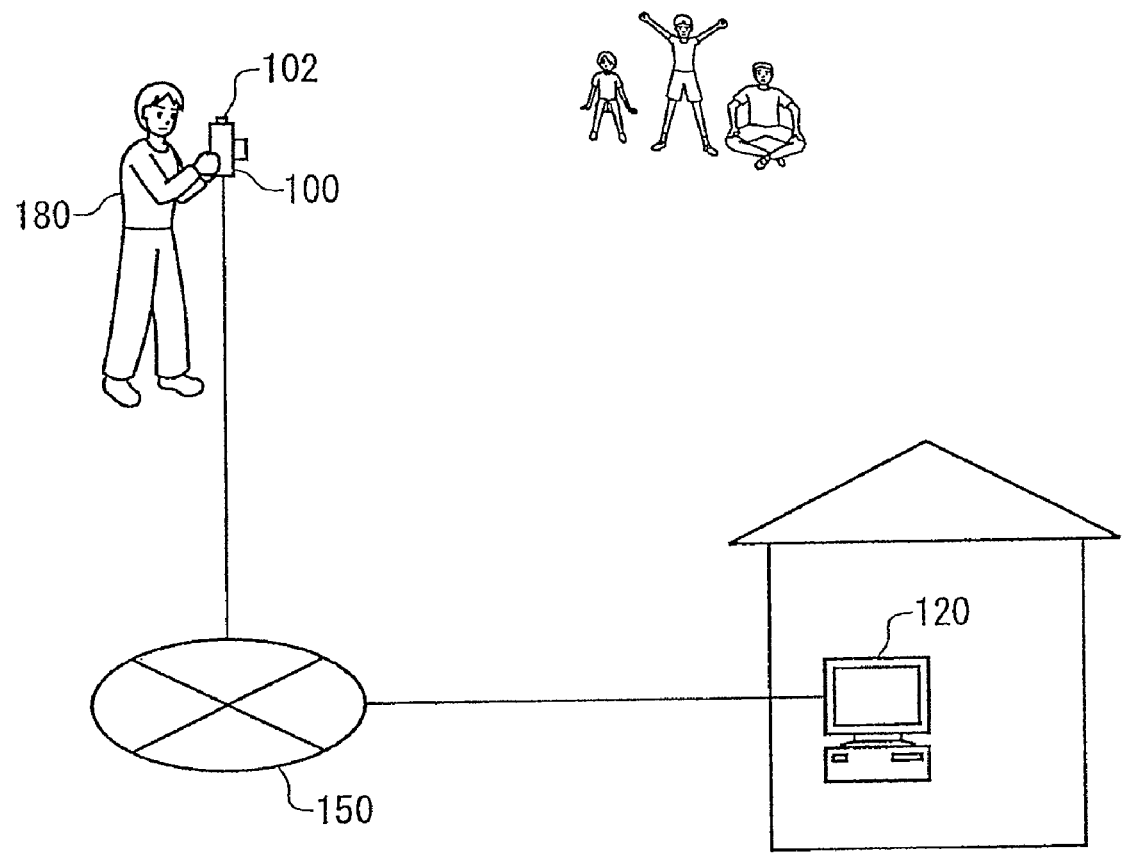
FIG. 1 shows an example of the environment for the usage of an image capturing system 170.

FIG. 1 shows an example of the environment for the usage of an image capturing system 170. The image capturing system 170 includes an image capturing apparatus 100 and an image processing apparatus 120. When a user 180 half-pushes a release button 102 of the image capturing apparatus 100 while the subject is placed at the center of a monitor screen, the image capturing apparatus 100 captures a pre-image and adjusts a focal distance to the subject. Then, the image capturing apparatus 100 trims a region image including the focal point in the pre-image and previously stores the same in the volatile memory. Then, when the user 180 full-pushes the release button 102, the image capturing apparatus 100 acquires the captured image at the timing at which the button is full-pushed, tags the region image to the captured image as tag information thereof and records the same in a nonvolatile memory.

The image processing apparatus 120 receives the image and the region image captured by the image capturing apparatus 100 through a communication line 150 such as Internet and a recording medium such as a semiconductor memory, and extracts the subject positioned at the center of the region image as the main subject. Then, the image processing apparatus 120 identifies the position of the main subject in the captured image by comparing the main subject with the subject of the captured image. Then, the image processing apparatus 120 lays out each image such that characters of the title are not superimposed on the position of the main subject, processes the main subject by emphasis processing and processes the region other than the main subject by shading processing to generate image data. The image processing apparatus 120 outputs the generated data to an external output device such as a display and a printer.

The image capturing apparatus 100 may be a digital still camera and a video camera and also may be a camera cellphone, and a handheld terminal having image capturing function such as PDA. The image processing apparatus 120 may be a personal computer, an electronic album, an electronic photo-stand and a HDTV.

According to the above-described image capturing system 170, the image capturing apparatus 100 can automatically record information on the main subject intended to be captured by the user 180 at image-capturing. Then, the image processing apparatus 120 can output the captured image by laying out the captured image such that the title is not superimposed on the main subject and the main subject is enhanced. Therefore, the user 180 can obtain the desired output result without any work such as laying out the image.

Figure 2:
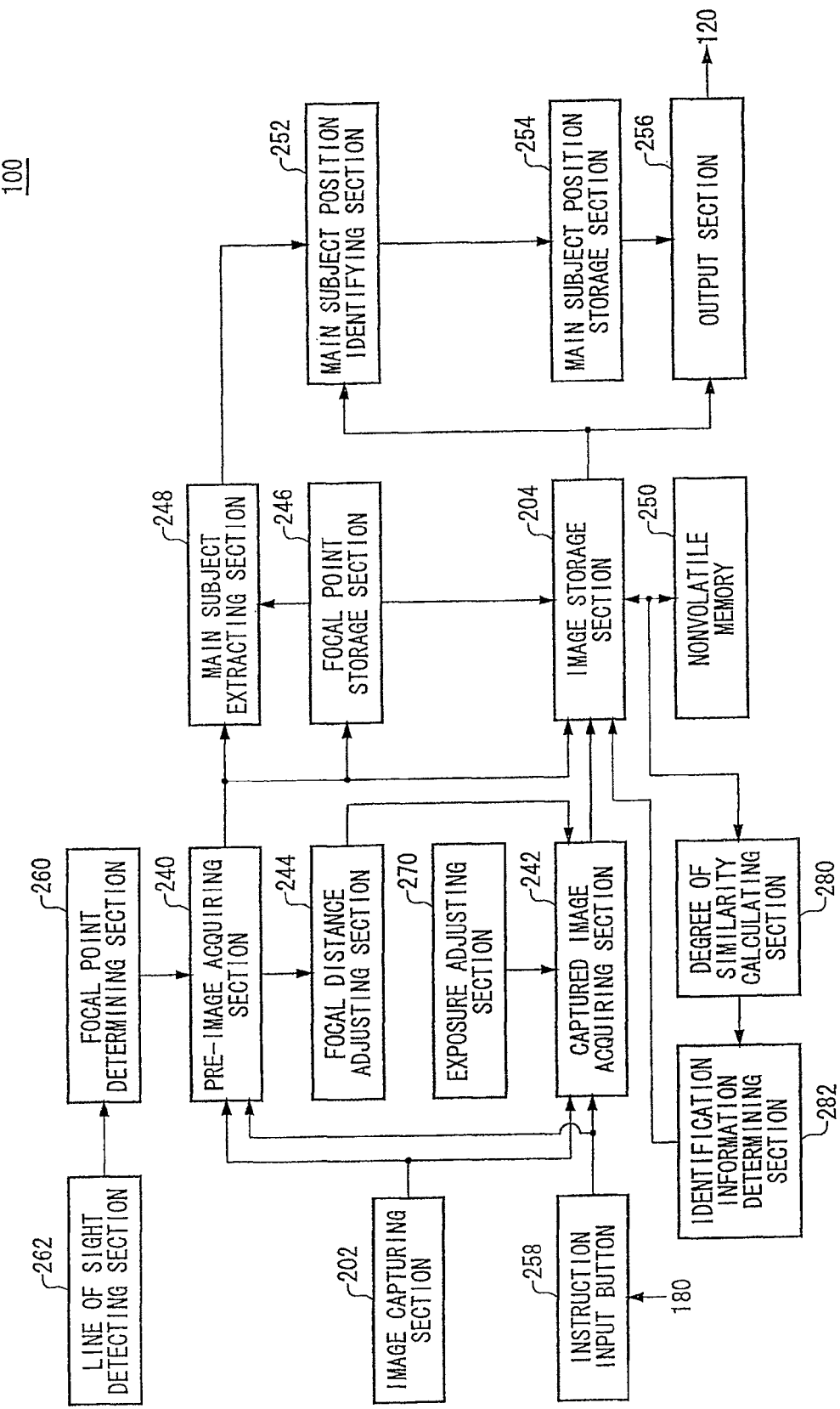
FIG. 2 shows an example of the block configuration of an image capturing apparatus 100.

FIG. 2 shows an example of the block configuration of an image capturing apparatus 100. The image capturing apparatus 100 includes an image capturing section 202, an image storage section 204, a pre-image acquiring section 240, a captured image acquiring section 242, a focal distance adjusting section 244, a focal point storage section 246, a main subject extracting section 248, a nonvolatile memory 250, a main subject position identifying section 252, a main subject position storage section 254, an output section 256, an instruction input button 258, a focal point determining section 260, a line of sight detecting section 262, an exposure adjusting section 270, a degree of similarity calculating section 280 and an identification information determining section 282.

The image capturing section captures images. Specifically, the image capturing section 202 receives light from the subject by an image capturing device such as a CCD to capture the image of the subject. Additionally, the image capturing section 202 may hold the predetermined number of images which can be obtained by continuously capturing images.

The pre-image acquiring section 240 acquires a pre-image captured by the image capturing section 202 when a focal point provided at a predetermined position in the image capturing region within the image capturing section 202. The instruction input button 258 causes the pre-image acquiring section 240 to acquire the pre-image through half-pushing the instruction input button 258 by a user. Then, the instruction input button 258 causes the captured image acquiring section 242 to acquire the captured image through further full-pushing by the user 180. Here, the instruction input button 258 may be a release button 102.

Then, the pre-image acquiring section 240 acquires the pre-image captured by the image capturing section 202 through half-pushing the instruction input button 258. Specifically, the pre-image acquiring section 240 acquires the pre-image captured by the image capturing section 202 through half-pushing an instruction input button 258. Specifically, the pre-image acquiring section 240 acquires an image captured by the image capturing section 202 at the timing at which the instruction input button 258 is half-pushed. Then, the image capturing section 202 adjusts the focal distance to the main subject on which the focal point is superimposed based on the analysis result of the pre-image acquired by the pre-image acquiring section 240.

Specifically, the focal distance adjusting section 244 adjusts the focal distance of the image capturing section 202 to the main subject based on the analysis result of the pre-image acquired by the pre-image acquiring section 240. For example, the focal distance adjusting section 244 acquires a plurality of pre-images as changing the focal distance and compares the contrast for each pre-image to adjust the focal distance in order to increase the contrast.

Then, the captured image acquiring section 242 acquires the image captured by the captured image acquiring section 242 after the image capturing section 202 adjusts the focal distance to the main subject through full-pushing the instruction input button 258.

The focal position storage section 346 stores the focal position to the image capturing range of the image capturing section 202. The focal position may be a predetermined position on an image capturing range of the image capturing section 202. Specifically, the focal position may be the position at the center of the image capturing region by the image capturing section 202.

The captured image acquiring section 242 acquires the image captured by the image capturing section 202 when the image capturing section 202 focuses on the main subject. The image storage section 204 stores the region image including the focal position stored in the focal position storage section 346 in the pre-image acquired by the pre-image acquiring section 240.

Therefore, the image capturing apparatus 100 can store the image of the main subject which is focused on and captured by the user 180. Additionally, even if the main subject is out of the focal point at image-capturing as the case that the user 180 half-pushes the instruction button 258, changes the image capturing direction and then, full-pushes the release button 102, the position of the main subject in the captured image can be identified by comparing the main subject at the focal point in the pre-image with the subject of the captured image.

The output section 256 outputs the captured image and the region image stored in the nonvolatile memory 250 to the external device in association with each other. Specifically, the output section 256 outputs the region image and the captured image to the image processing apparatus 120.

Here, the resolution of the pre-image acquired by the pre-image acquiring section 240 is lower than that of the captured image acquired by the captured image acquiring section 242. Specifically, the pre-image acquiring section 240 acquires a partial region including the focal point within the image capturing region of the image capturing section 202 as the pre-image. Therefore, the nonvolatile memory 250 can be prevented from being pressed by the pre-image data. Additionally, the pre-image acquiring section 240 need not read the amount of light received from CCDs other than the CCD of the region including the focal point. Therefore, the reading speed can be higher than the speed when the amount of light received is read from all the CCDs. Therefore, the period for actually starting to capture an image since the user 180 half-pushes the shutter can be reduced.

The main subject extracting section 248 extracts the main subject from the pre-image acquired by the pre-image acquiring section 240 based on the focal position on the image capturing range of the image capturing section 202 stored in the focal position storage section 346. Specifically, the main subject extracting section 248 extracts the outline of the subject from the pre-image by an edge extraction and extracts the subject including the focal position as the main subject.

The main-subject position identifying section 252 identifies the position of the main subject extracted by the main subject extracting section 248 in the captured image acquired by the captured image acquiring section 242. Specifically, the main subject position identifying section 252 extracts the pattern of the outline of the subject from the captured image by the edge extraction and matches the extracted pattern with the pattern of the outline of the main subject to identify the position of the main subject. The main subject position storage section 254 stores the position of the main subject in the captured image identified by the main subject position identifying section 252 in association with the captured image acquired by the captured image acquiring section 242.

The pre-image acquiring section 240 acquires a plurality of pre-images captured by the image capturing section 202 every time the instruction input button 258 is half-pushed. Then, the focal distance adjusting section 244 adjusts the focal distance to the main subject on which the focal point is superimposed based on the analysis result of the pre-image acquired by the pre-image acquiring section 240 every time the instruction input button 258 is half-pushed. Then, the focal position storage section 346 stores the focal position on the image capturing range of the image capturing section 202 which is adjusted by the focal distance adjusting section 244. Then, when the instruction input button 258 is half-pushed several times, the image capturing section 202 determines the image capturing condition based on a plurality of focal distances adjusted by the focal distance adjusting section 244 every time the instruction input button 258 is half-pushed.

Then, the captured image acquiring section 242 acquires the image captured by the image capturing section 202 after the image capturing condition is changed to the image capturing condition determined by the image capturing section 202 through the instruction input button is full-pushed. Then, the image storage section 204 stores the region image including the focal position stored in the focal position storage section 346 in each of the plurality of pre-images acquired by the pre-image acquiring section 240 every time the instruction input button 258 is half-pushed. Therefore, the image capturing apparatus 100 can capture a plurality of subjects as adjusting the image capturing condition to capture simultaneously the plurality of images with an appropriate image quality, trim the region image including the subject designated by half-pushing the release button 102 and record the same.

Specifically, when the instruction input button 258 is half-pushed several times, the image capturing section 202 determines a focal distance obtained by averaging the focal distance adjusted to the main subject by the focal distance adjusting section 244 every time the instruction input button 258 is half-pushed in the case that the instruction input button 258 is half-pushed several times. Then, the captured image acquiring section 242 acquires the image captured by the image capturing section 202 after the image capturing condition is adjusted to the focal distance determined by the image capturing section 202 when the instruction input button 258 is full-pushed after the instruction input button 258 is half-pushed several times. Therefore, the image capturing apparatus 100 can determine the image capturing condition to prevent any subject of a plurality subjects from strikingly burring.

Additionally, the image capturing section 202 determines the depth of field based on the focal distance on the main subject adjusted by the focal distance adjusting section 244 every time the instruction input button 258 is half-pushed in the case that the instruction input button 258 is half-pushed several times. Then, when the instruction input button 258 is full-pushed after being half-pushed several times, the captured image acquiring section 242 acquires the image captured by the image capturing section 202 after the image capturing condition is adjusted to the depth of field determined by the image capturing section 202.

The exposure adjusting section 270 adjusts the exposure of the image capturing section 202 to the main subject on which the focal point is superimposed based on the pre-image acquired by the pre-image acquiring section 240 every time the instruction input button 258 is half-pushed. Then, the image capturing section 202 determines the image capturing condition further based on a plurality of exposure values adjusted by the exposure value adjusting section 270 every time the instruction input button 258 is half-pushed in the case that the instruction input button 158 is half-pushed several times. Then, when the input instruction button 258 is full-pushed after being half-pushed several times, the captured acquiring section 242 acquires the image captured by the image capturing section 202 after the image capturing condition of the image capturing section 202 is adjusted to the image capturing condition determined by the image capturing section 202. Therefore, the image capturing apparatus 100 can determine the image capturing condition to prevent any subject among a plurality of subjects from being captured strikingly darkly.

The degree of similarity calculating section 280 calculates the degree of similarity between a first region image and a second region image by comparing the first region image stored in the nonvolatile memory 250 with the second region image to be newly stored in the nonvolatile memory 250. Then, the identification information determining section 282 determines the same identification information on the first region image and the second region image when the degree of similarity calculated by the degree of similarity calculating section 280 is larger than a predetermined degree of similarity. Then, the image storing section 204 stores the first region image and the second region image in the nonvolatile memory 250 in association with the identification information determined by the identification information determining section 282. Therefore, the image storage section 204 can store the region images including the similar subject to which the same identification is tagged. Therefore, when the image stored in the nonvolatile memory 250 is outputted, the image capturing apparatus can count the number of region images to which the same identification information is tagged and emphatically display the subject included in the region images which are counted more times.

The line of sight determining section 262 detects the line of sight of the photographer to the image capturing region of the image capturing section 202. Then, the focal point determining section 260 determines the focal point to the position in the image capturing region indicated by the line of sight detected by the line of sight detecting section 262. Then, the pre-image acquiring section 240 acquires the pre-image captured by the image capturing section 202 when the focal point determined by the focal point determining section 260 is superimposed on the main subject. Then, the focal distance adjusting section 244 adjusts the focal distance of the image capturing section 202 to the main subject based on the analysis result of the pre-image acquired by the pre-image acquiring section 240. Then, the captured image acquiring section 242 acquires the image captured by the image capturing section 202 when the image capturing section 202 focuses on the main subject. Therefore, the image capturing apparatus 100 can adjust the focal point to the subject which is placed in the direction of the line of sight of the user 180, so that the user 180 can easily designate the main subject to be focused.

According to the image capturing apparatus 100 as thus described above, the user 180 can automatically record information on the interested subject captured by the user 180 along with the captured image at image-capturing. Therefore, various image processing can be executed based on the information on the main subject stored in the image capturing apparatus 100. For example, the image capturing apparatus 100 can provide the main subject data to the image processing apparatus 120 to utilize the same to create an album. Additionally, the image capturing apparatus 100 can create a thumbnail image using the region image of the main subject and provide the same to the user 180.

Figure 3:
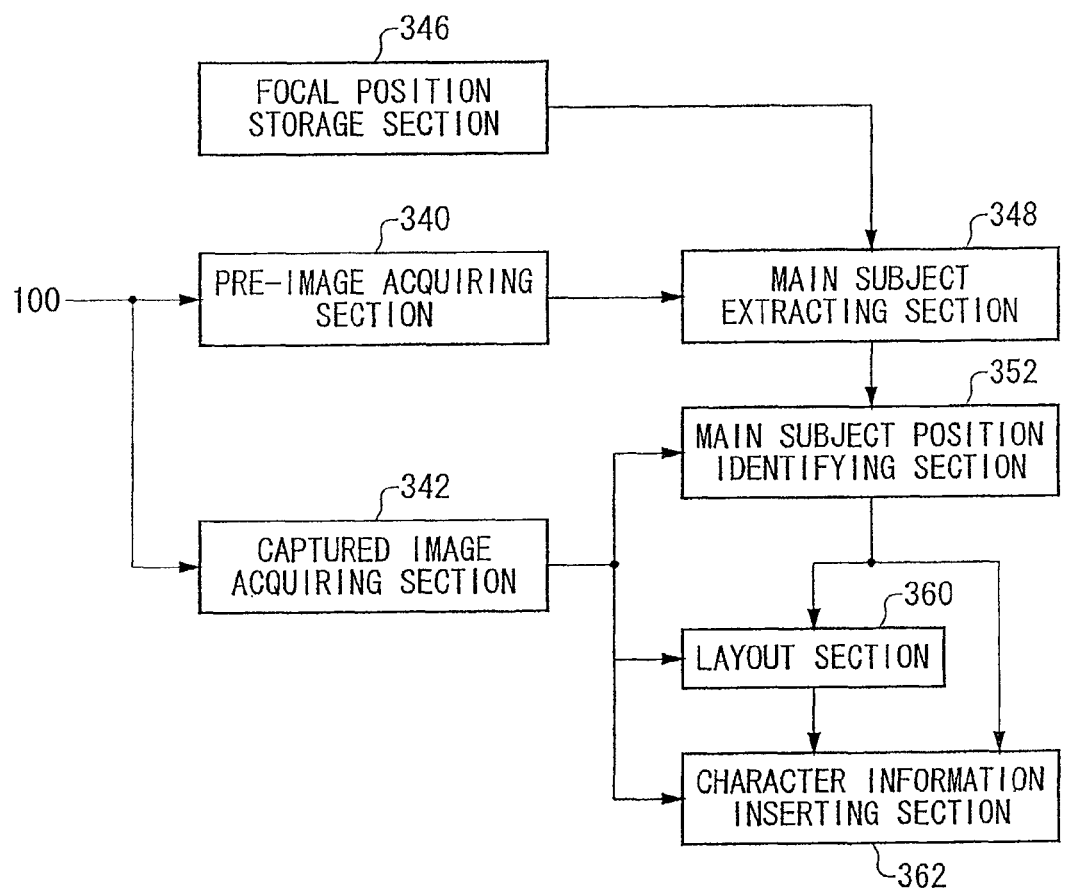
FIG. 3 shows an example of the block configuration of an image processing apparatus 120.

FIG. 3 shows an example of the block configuration of an image capturing apparatus 120. The image processing apparatus 120 includes a pre-image acquiring section 340, a captured image acquiring section 342, a focal position storage section 346, a main subject extracting section 348, a main subject position identifying section 352, a layout section 360 and a character information inserting section 362.

The pre-image acquiring section 340 acquires the pre-image captured by the image capturing apparatus 100 when the focal point at a predetermined position within the image capturing range of the image capturing apparatus 100 is superimposed on the main subject. For example, the pre-image acquiring section 240 acquires the region image received from the output section 256 as the pre-image.

The captured image acquiring section 342 acquires the image captured by the image capturing apparatus 100 when the image capturing apparatus 100 focuses on the main subject. Specifically, the captured image acquiring section 242 acquires the captured image from the output section 256.

The focal position storage section 346 stores the position of the focal point on the image capturing range of the image capturing apparatus 100. Specifically, the focal position storage section 346 may previously store the focal position of the image capturing apparatus 100.

The main subject extracting section 348 extracts the main subject from the pre-image acquired by the pre-image acquiring section 340 based on the focal position on the image capturing range of the image capturing apparatus 100 which is stored in the focal position storage section 346. The main subject position identifying section 352 identifies the position of the main subject extracted by the main subject extracting section 348 in the captured image acquired by the captured image acquiring section 342. Therefore, the image processing apparatus 120 can execute various image processing on the image region including the position of the identified main subject.

Here, the operation to extract the main subject by the main subject extracting section 348 and the operation to identify the position of the main subject by the main subject position identifying section 352 are the same as each operation of the main subject extracting section 248 and the main subject position identifying section 252, respectively, so that the description is omitted.

The layout section 360 lays out a plurality of captured images into the output area such that the plurality of captured images are not superimposed on the position of the main subject in the captured image identified by the main subject position identifying section 352. Additionally, the character information inserting section 362 inserts the character information into the output area such that the character information is not superimposed on the position of the main subject identified by the main subject position identifying section 352. Therefore, the image processing apparatus 120 can output with the layout without covering the main subject.

As described above, the image processing apparatus 120 can output an album with laying out the captured image based on the position of the main subject of the captured image. For example, the title of the album can be placed at the position at which the title is not superimposed on the main subject, and the other captured images can placed in front of the main subject without superimposing on the main subject. Additionally, the image processing apparatus 120 can execute various image processing to emphatically display the main subject, enlarge the main subject and trim the main subject, for example. Therefore, the image processing apparatus 120 can provide to the user 180 the image data desired by the user 180.

Figure 4:
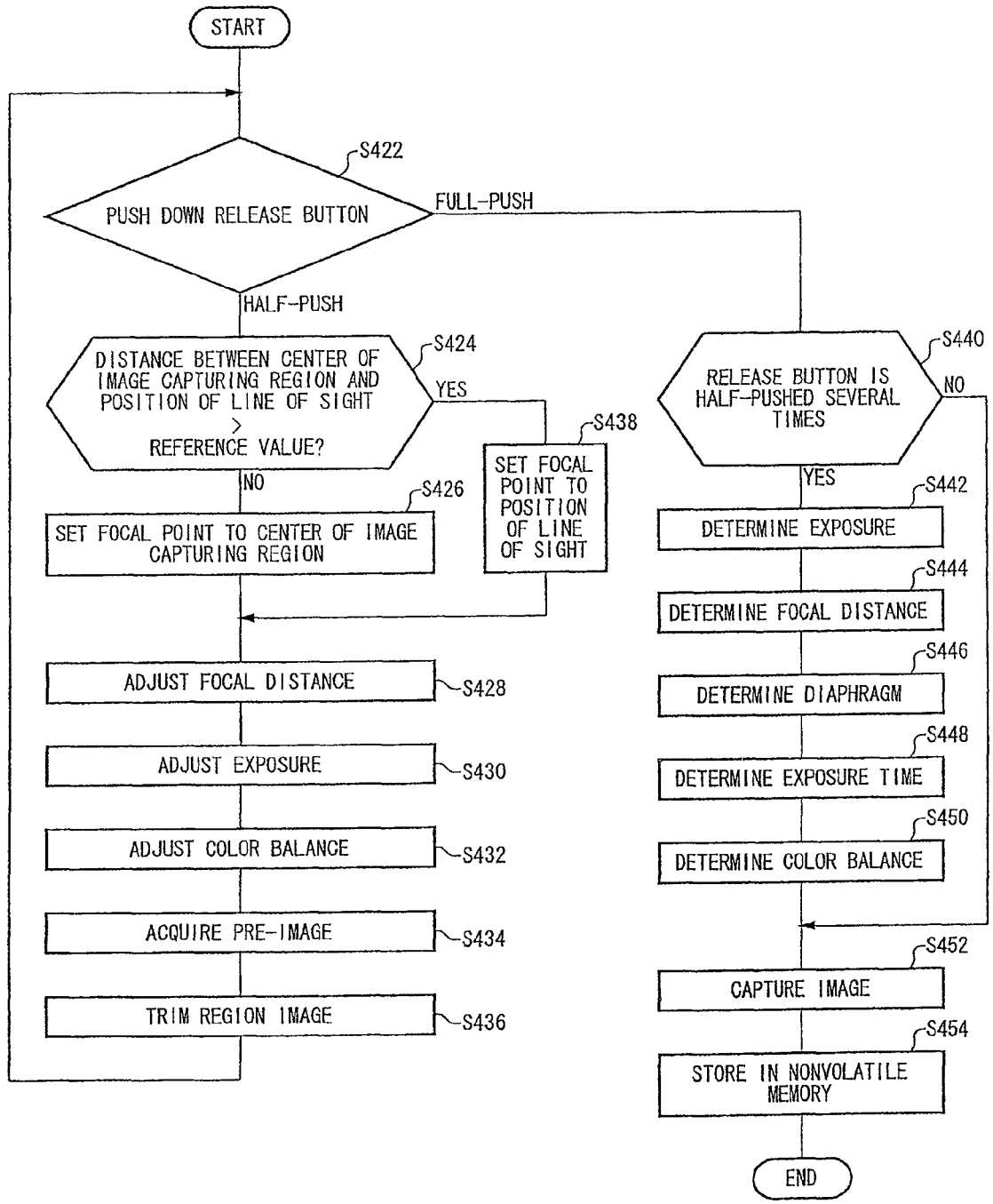
FIG. 4 shows an example of flowchart of a processing of the image capturing apparatus 100 at image-capturing.

FIG. 4 shows an example of flowchart of a processing of the image capturing apparatus 100 at image-capturing. Detecting that the release button 102 is pushed down, the image capturing apparatus 100 determines whether the release button 102 is half-pushed or full-pushed (S422). When it is determined that the release button 102 is half-pushed in the S422, the line of sight detecting section 262 detects the position of the line of sight to the image capturing range of the user 180. For example, the line of sight detecting section 262 detects the line of sight by reflecting the light from a point source light on the cornea of the user 180 who looks in at the finder of the image capturing apparatus 100, acquires the facial image of the user 180 who watches the monitor screen of the image capturing apparatus 100 and then, detects the line of sight based on the relationship among the position of eyes, nose and mouth to identify the position of the line of sight of the user 180.

The focal point determining section 260 calculates the distance between a predetermined focal position such as the center of the image capturing region in the image capturing region by the image capturing section 202 at the timing at which the release button 102 is half-pushed and the position of line of sight identified by the line of sight detecting section 262 and determines whether the distance is more than a reference value (S424). When it is determined that the distance is less than the reference value in the S424, the focal point determining section 260 sets the focal point to the subject positioned at the predetermined focal position (S426). Additionally, when the distance is more than the reference value in the S424, the focal point determining section 260 sets the focal point to the subject positioned at the line of sight (S438).

Then, the focal distance adjusting section 244 focuses on the subject superimposed on the focal point (S428), and the exposure adjusting section 270 adjusts the exposure in order to capture the subject with an appropriate brightness (S430). Here, the exposure adjusting section 270 may define a diaphragm and an exposure time in the S430 to adjust the exposure. Additionally, the image capturing section 202 adjusts the image processing condition based on the pre-image acquired by the pre-image acquiring section 240 such that the image of the subject superimposed on the focal point determined by the focal point determining section 260 will have desired color balance (S432). Then, the pre-image acquiring section 240 acquires the pre-image captured by the image capturing section 202 under the image capturing condition involving the result adjusted in the S428—the S432 (S434). Then, the image storage section 204 trims the region image with the size including the subject superimposed on the focal point from the pre-image acquired in the S434 and temporarily stores the same in the volatile memory (S436). Additionally, the image capturing apparatus 100 stores the image capturing condition adjusted the S428—the S432, such as the focal distance and the exposure, and the image processing condition such as color balance in the volatile memory. Additionally, the image capturing apparatus 100 increments a half-pushing counter indicative of the number of half-pushing the release button 102 and stores the same in the volatile memory. Here, when the focal point determining section 260 determines that the focal point is the line of sight in the S438, information such as a mark which identifies the focal point on the pre-image acquired in the S434 may be presented to the user 180 in order to notify the user 180 of the position. Here, the image capturing section 202 fixes once the image capturing condition for the image capturing section 202 and the image processing condition under the image capturing condition adjusted in the S420—the S432.

The image capturing apparatus 100 shifts the process to a determining process of S422. Then, the image capturing apparatus 100 executes a sequence to acquire the region image in a series of processing from S424 to S438. Then, when it is determined that the release button 102 is full-pushed in the S422, the image capturing apparatus 100 determines whether the release button 102 is half-pushed several times before it is full-pushed (S440). Specifically, the image capturing apparatus 100 determines whether the half-pushing counter indicates two or more. Here, the image capturing apparatus 100 may determine whether the release button 102 is half-pushed several times during a predetermined period before the timing at which the release button 102 is full-pushed (including the timing at which the release button 102 is full-pushed). For example, the image capturing apparatus 100 may reset the half-pushing counter every time the predetermined period lapses without half-pushing and full-pushing the release button 102. At this time, the image capturing apparatus 100 may erase the region image and the image capturing condition stored in the volatile memory in the sequence to acquire the region image in the S424—the S438.

When it is determined that the release button 102 is not half-pushed in the S440, the image capturing section 202 captures the subject (S452) and acquires the captured image by the captured image acquiring section 242. Here, when the half-pushing counter indicates one, the image capturing section 202 captures the image under the image capturing condition determined in the sequence to acquire the region image. Then, the image storage section 204 stores the region image stored in the volatile memory and the captured image acquired by the captured image acquiring section 242 in the nonvolatile memory 250 in association with each other (S454) and ends the process. Meanwhile, when the half-pushing counter indicates 0, that is, the half-counter is the initial state or the half-counter is reset, the image capturing section 202 determines the image capturing condition and the image processing condition by the processing the same as from the S424 to the S436 on the subject superimposed on the position of line of sight or the predetermined focal point and trims the region image used to determine the condition. Then, the image capturing section 202 captures the image under the determined image capturing condition. Then, the image storage section 204 stores the region image and the captured image in the nonvolatile memory 250 in association with each other.

Meanwhile, it is determined that the release button 102 is half-pushed several times in the S440, the image capturing section 202 determines the exposure for which each subject superimposed on the focal point at the timing at which the release button 102 is half-pushed is captured with the appropriate brightness (S442). For example, the average value of the exposure determined by the exposure adjusting section 270 in the S430 may be the exposure to captured the image. Then, the image capturing section 202 determines the depth of field being capable of clearly capturing each subject. Specifically, the image capturing section 202 determines the depth of field being capable of most clearly capturing each subject based on the distance to each subject. Then, the image capturing section 202 determines the focal distance, the diaphragm and the exposure time being capable of satisfying the determined depth of field and the exposure determined in the S442 (S444, 446 and 448). Then, the image capturing section 202 determines a color balance to capture each subject in a balanced manner based on the image processing condition stored in the volatile memory (S450). Then, the image capturing section 202 captures the subject under the image capturing condition determined in the S446—the S450 (S452). Then, the captured image acquiring section 242 acquires the image captured by the image capturing section 202, stores each region image trimmed in the S436 every time the release button 102 is pushed and stored in the volatile memory and the captured image in the nonvolatile memory 250 in association with each other (S454) and ends the process.

Here, when the image storage section 204 newly stores the region image in the nonvolatile memory 250 in the S454, the degree of similarity calculating section 280 compares the subject included in the region image newly stored with the subject included in the region image which has been stored in the nonvolatile memory 250 in association with the captured image to calculate the degree of similarity of the subject. Specifically, the degree of similarity calculating section 280 may identify the kind of subject by pattern-matching the outline of the subject previously determined for each kind of the subject with the outline of the subject included in the region image and calculate the degree of similarity higher when the kind of the subject included in the region image to be newly stored is the same as the kind of the subject included in the region image which has been stored in the nonvolatile memory 250. Additionally, when the degree of similarity calculating section 280 identifies the kind of the subject included in the region image as a person, the degree of similarity calculating section 280 may calculate the degree of similarity of the person's face included in the region image. Then, when the degree of similarity calculated by the degree of similarity calculating section 280 is more than the predetermined reference value, the identification information determining section 282 determines the same ID for the region image. Then, the image storage section 204 stores the ID determined by the identification information determining section 282 in the nonvolatile memory 250 in association with the region image to be newly stored.

FIG. 5 shows an example of data stored in the nonvolatile memory 250 by the image storage section 204. The image storage section 204 stores the region image ID in the nonvolatile memory 250 in association with the image ID to identify the captured image in addition to the captured image. The region image ID may any number value to uniquely identify the region image trimmed in the S436 and also may be any value of character string. Additionally, the image storage section 204 stores the ID to identify the region image identified by the region image ID in the nonvolatile memory 250 in association with one or more region image ID and a comment. As described above with reference to FIG. 4, the image storage section 204 determines the same ID for the region image with the degree of similarity higher than the reference value and stores the same in the nonvolatile memory 250. Here, the image storage section 204 stores the comment inputted from the user 180 in association with the ID in the nonvolatile memory 250. The comment and the ID stored in the nonvolatile memory 250 are utilized when the image processing apparatus 120 processes the captured image.

Figure 6:
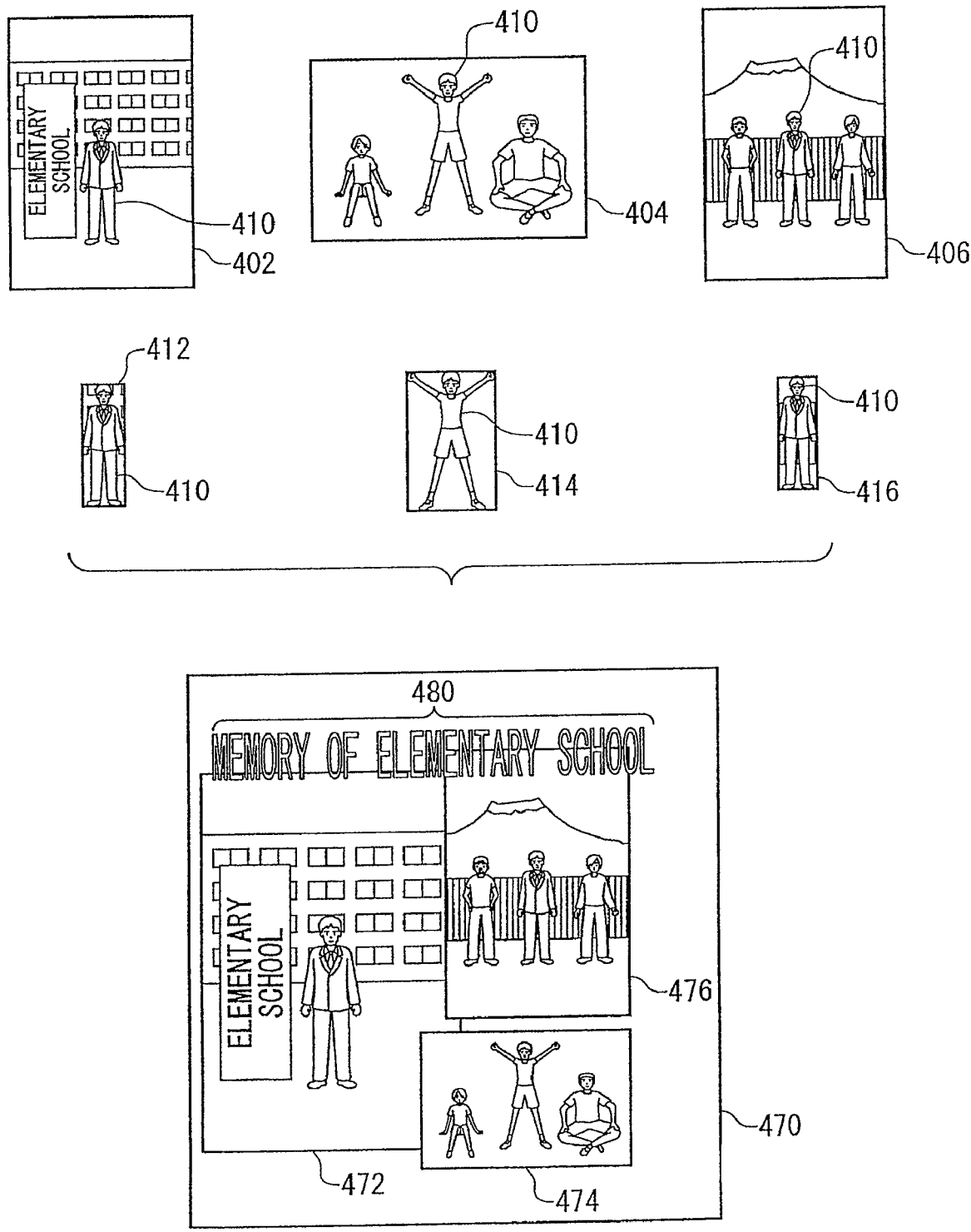
FIG. 6 shows an example of the layout result by the image processing apparatus 120.

FIG. 6 shows an example of the layout result by an image processing apparatus 120. FIG. 6 shows one page 470 of the album in which captured images 402, 404 and 406 are laid out. The user 180 sets the focal point to a main subject 410, half-pushes the release button 102 to adjust the focal distance to the main subject 410 and then, captures each of the images 402, 404 and 406 using the image capturing apparatus 100. At this time, the pre-image acquiring section 240 acquires a pre-image at each timing at which the release button 102 is half-pushed. Then, the captured image acquiring section 242 reads the output of the CCD in the region including the focal point and acquires region images 412, 414 and 416. Then, the image storage section 204 tags the region images 412, 414 and 416 to the captured images 402, 404 and 406 as each tag information, respectively and stores the same in the nonvolatile memory 250.

Then, the main subject position identifying section 352 identifies the range including the position of the main subject 410 extracted from the focal position included in the region images 412, 414 and 416 for each of the captured images 402, 404 and 406. Then, the layout section 360 determines the position at which the captured images 402, 404 and 406 are placed such that the other images are not superimposed on the front of the range of the main subject for each captured image. Then, the character information inserting section 362 inserts a character 480 into the position at which the character 280 is not superimposed on the range including the main subject 410.

Here, the layout section 360 may previously store image frames 472, 474 and 476 into which the captured images are fitted. Then, the layout section 360 may determine the captured images to be fitted into the image frames 472, 474 and 476 such that the captured images are not overlapped with the range including the main subject.

Here, the layout section 360 may display or print the comment acquired from the nonvolatile memory 250 of the image capturing apparatus 100 near the position of the subject included in the region image associated with the captured image to be laid out. For example, the character information inserting section 362 may insert the character 480 with the comment. Additionally, the layout section 360 can count the number of the region images associated with the ID acquired from the nonvolatile memory 250 for each ID and emphatically display or print the captured image associated with the region image associated with ID of the region image of which number is counted more times. For example, the layout section 360 may lay out such that the captured image associated with the region image associated with the ID of the region image of which number is counted more times or the subject included in the region image is larger and is disposed more centrally than the other subjects laid out in the same page.

According to the above-described image capturing system 170, the image of the main subject can be automatically recorded along with the captured image when the image capturing apparatus 100 captures an image. Therefore, the image processing apparatus 120 identifies the position of the main subject in the captured image based on the image of the recorded main subject to output the image in which the main subject is appropriately processed. Thereby the user 180 can appropriately output the captured main subject by means of the image capturing system 170. Additionally, according to the image capturing system 170, if the user 180 captures the image by adjusting the focal point to the object liked by the user 180 and then half-pushing the release button, the captured image can be laid out such that the captured image including the object is enhanced and the position of the object in the captured image is enhanced.

Hereinbefore, it has been described that the focal point is the central image region in the image capturing region. The focal point may include the image region out of the center in the image capturing region. The focal point storage section 246 or the focal position storage section 346 stores any position in the image capturing region as the focal position. Therefore, the main subject extracting section 248 and the main subject extracting section 348 can appropriately extract the main subject even if the focal point of the image capturing apparatus 100 is placed at the position out of the center.

Figure 7:
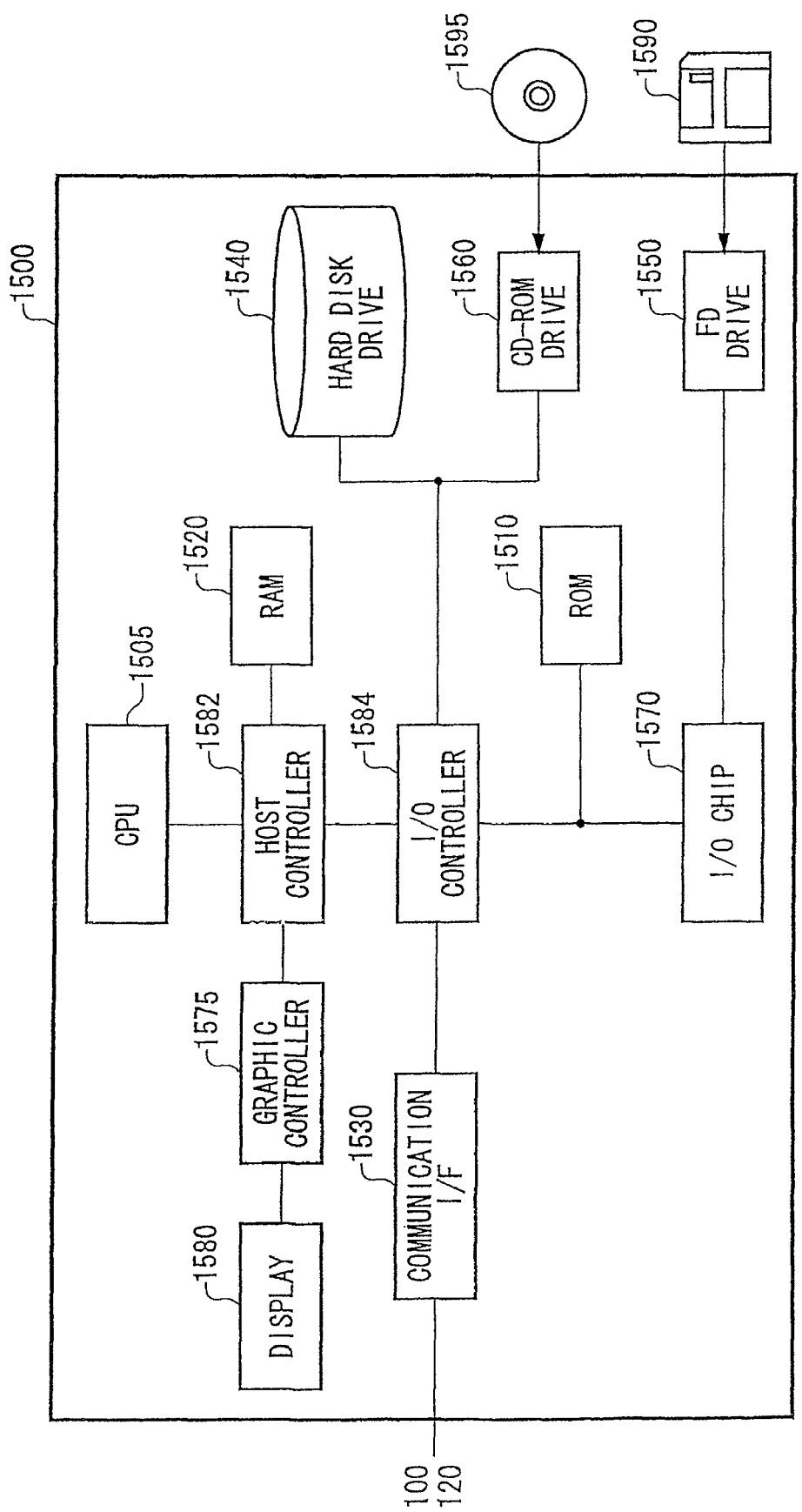
FIG. 7 shows an example of the hardware configuration of a computer 1500 involved in the image capturing apparatus 100 and the image processing apparatus 120.

FIG. 7 shows an example of the hardware configuration of a computer 1500 involved in the image capturing apparatus 100 and the image processing apparatus 120 according to the present embodiment. The computer 1500 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, a communication interface 1530 and a CD-ROM drive 1560 which are relatively high-speed input/output units. The hard disk drive 1540 stores the program and data used by the CPU 1505 of the computer 1500. The communication interface 1530 communicates with the image capturing apparatus 100 and the image processing apparatus 120 through a network to provide the program or data to the image capturing apparatus 100 and the image processing apparatus 120. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the computer 1500 at activating and a program depending on the hardware of the computer 1500. The flexible disk drive 1550 reads the program or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

The program provided to the communication interface 1530 through the RAM 1620 is stored in a recording medium, such as the flexible disk 1590, the CD-ROM 1595, or an IC card and provided by the user. The program is read from the recording medium, provided to the communication interface 1530 through the RAM 1520 and transmitted to the image capturing apparatus 100 and the image processing apparatus 120 through the network. Each program transmitted to the image capturing apparatus 100 and the image processing apparatus 120 is installed in the image capturing apparatus 100 and the image processing apparatus 120 and executed, respectively.

The program installed and executed in the image capturing apparatus 100 operates the image capturing apparatus 100 to function as the image capturing section 202, the image storage section 204, the pre-image acquiring section 240, the captured image acquiring section 242, the focal distance adjusting section 244, the focal point storage section 246, the main subject extracting section 248, the nonvolatile memory 250, the main subject position identifying section 252, the main subject position storage section 254, the output section 256, the instruction input button 258, the focal point determining section 260, the line of sight detecting section 262, the exposure adjusting section 270, the degree of similarity calculating section 280 and the identification information determining section 280 described above with reference to FIG. 1-FIG. 6. Meanwhile, the program installed and executed in the image processing apparatus 120 operates the image processing apparatus 120 to function as the pre-image acquiring section 340, the captured image acquiring section 342, the focal position storage section 346, the main subject extracting section 348, the main subject position identifying section 352, the layout section 360 and the character information inserting section 362 described above with reference to FIG. 1-FIG. 6.

The above-described program may be stored in an external storage medium. The external recording medium may be an optical storage medium such as a DVD and a PD, a magneto-optical recording medium such as a MD, a tape medium and a semiconductor memory such as an IC card. A storage medium such as a hard disk or a RAM which is provided in the server system connected to a private communication network or Internet is used as the recording medium to provide the program to the computer 1500 through the network.

While the present invention has been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

The invention claimed is:

1. An image capturing apparatus comprising:
an image capturing section;
a pre-image acquiring section for acquiring a pre-image captured by the image capturing section when a focal point provided at a predetermined position within the image capturing region of the image capturing section is superimposed on a main subject;
a focal distance adjusting section for adjusting a focal distance of the image capturing section to the main subject based on an analysis result of the pre-image acquired by the pre-image acquiring section;
a captured image acquiring section for acquiring the image captured by the image capturing section when the image capturing section focuses on the main subject;
a focal position storage section for storing a focal position on an image capturing range of the image capturing section; and
an image storage section for storing a region image including the focal position stored in the focal position storage section in the pre-image acquired by the pre-image acquiring section in a nonvolatile memory in association with the captured image acquired by the captured image acquiring section,
further comprising an instruction input button for causing the pre-image acquiring section to acquire the pre-image through half-pushing by a user and causing the captured image acquiring section to acquire the captured image through full-pushing by the user,
wherein:
the pre-image acquiring section acquires the pre-image captured by the image capturing section by half-pushing the instruction input button,
the focal distance adjusting section adjusts the focal distance to the main subject on which the focal point is superimposed based on the analysis result of the pre-image acquired by the pre-image acquiring section,
the captured image acquiring section acquires the image captured by the image capturing section after the image capturing section adjusts the focal distance to the main subject by full-pushing the instruction input button
the image acquiring section acquires a plurality of pre-images captured by the image capturing section every time the instruction input button is half-pushed,
the focal distance adjusting section adjusts the focal distance to the main subject on which the focal point is superimposed based on the analysis result of the pre-image acquired by the pre-image acquiring section every time the instruction input button is half-pushed,
the focal position storage section stores the focal position on the image capturing range of the image capturing section which is adjusted by the focal distance adjusting section every time the instruction input button is half-pushed,
the image capturing section determines an image capturing condition based on the plurality of focal distances adjusted by the focal distance adjusting section every time the instruction input button is half-pushed in the case that the instruction input button is half-pushed several times,
the captured image acquiring section acquires the image captured by the image capturing section after the image capturing condition is adjusted to the image capturing condition determined by the image capturing section through full-pushing the instruction input button, and
the image storage section stores the region image including the focal position stored in the focal position storage section in each of the plurality of pre-images acquired every time the pre-image acquiring section half-pushes the instruction input button in the nonvolatile memory in association with the captured image acquired by the captured image acquiring section.

2. The image capturing apparatus according to claim 1, wherein the image capturing section determines the focal distance obtained by averaging the focal distance adjusted to the main subject by the focal distance adjusting section every time the instruction input button is half-pushed every time the instruction input button is half-pushed several times, and the captured image acquiring section acquires the image captured by the image capturing section after the image capturing condition is adjusted to the focal distance determined by the image capturing section in the case that the instruction input button is full-pushed after the instruction input button is half-pushed several times.

3. The image capturing apparatus according to claim 1, wherein the image capturing section determines a depth of field based on the focal distance adjusted to the main subject by the focal distance adjusting section every time the instruction input button is half-pushed in the case that the instruction input button is half-pushed several times, and the captured image acquiring section acquires the image captured by the image capturing section after the image capturing condition is adjusted to the depth of field determined by the image capturing section in the case that the instruction input button is full-pushed after the instruction input button is half-pushed several times.

4. The image capturing apparatus according to claim 1 further comprising an exposure adjusting section for adjusting an exposure of the image capturing section to the main subject on which the focal point is superimposed based on the analysis result of the pre-image acquired by the pre-image acquiring section every time the instruction input button is half-pushed, wherein the image capturing section determines the image capturing condition further based on the plurality of exposure values adjusted by the exposure adjusting section every time the instruction input button is half-pushed in the case that the instruction input button is half-pushed several times, and the captured image acquiring section acquires the image captured by the image capturing section after the image capturing condition of the image capturing section is adjusted to the image capturing condition determined by the image capturing section in the case that the instruction input button is full-pushed after the instruction input button is half-pushed several times.

* * * * *